UNITED STATES PATENT OFFICE.

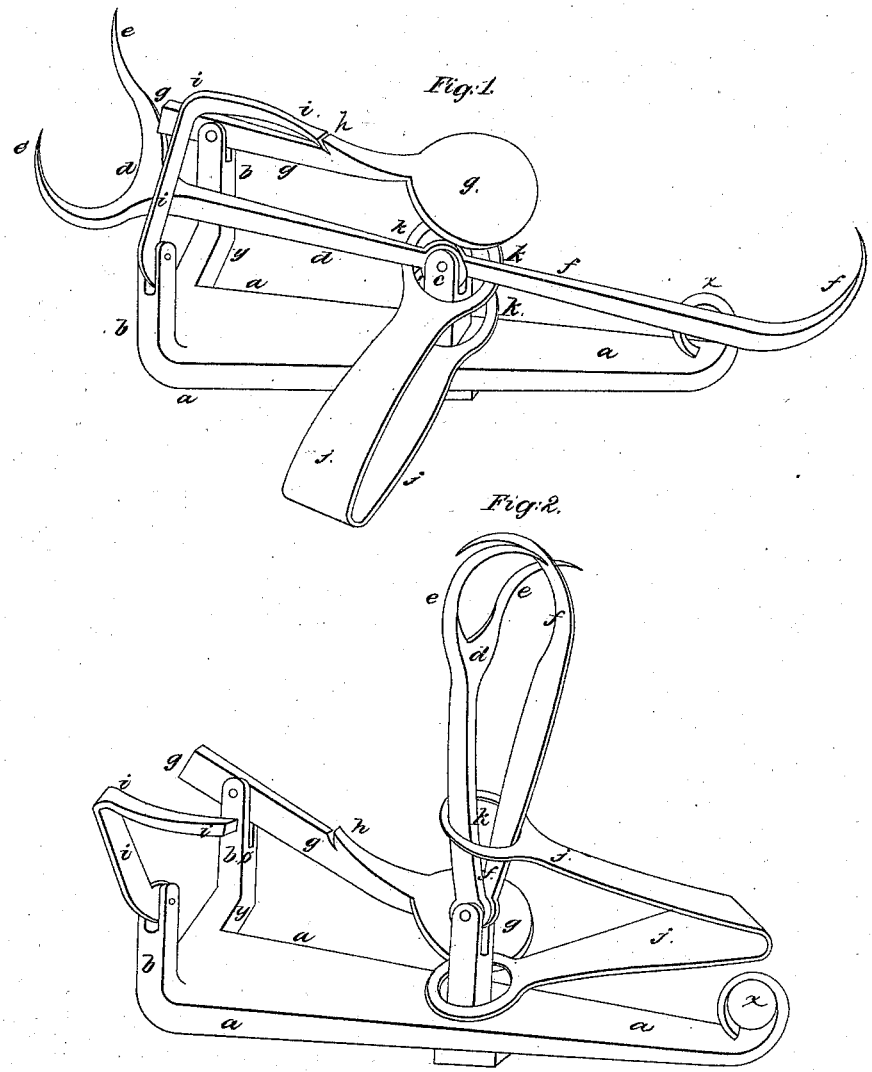

OLIVER PIER, OF HARMONY, NEW YORK.

TRAP FOR ANIMALS.

Specification of Letters Patent No. 11,175, dated June 27, 1854.

*To all whom it may concern:*

Be it known that I, OLIVER PIER, of Harmony, in the county of Chautauqua and State of New York, have invented and made certain new and useful Improvements in Traps for Catching Animals; and I do hereby declare that the following is a full, clear, and exact description of the method of construction and mode of operating the same, reference being had to the accompanying drawings and making a part of this specification, in which—

Figure 1 is a perspective view of the trap complete, and as it appears when set. $a$, $a$, $a$, show the base or bottom of trap, having its narrow tapering end formed in a tail ring, &c. $b$, is an upright, stem, or arm. $b$, $o$, is an arm, stem, or upright with an elbow $y$. $c$, is an upright, fulcrum stem, or support piece. $d$, is a grapple hook with double prongs $e$, $e$. $f$, $f$, is a single hook grapple. $g$, is a treadle—set or lever fall with catch or nick hold fast, $h$, in which hooks, when set, the latch $i$, $i$, $i$, $i$. $J$, $J$, is a compressed or folded spring having eyes $k$, $k$, $k$.

Fig. 2 is a view of the trap unset or sprung, with the latch $i$, $i$, $i$, thrown up, the treadle, or lever fall, $g$, $g$, $g$, down, the spring $J$, $J$, expanded, and compressing together by its upper eye $K$, $K$, the two grapples, $d$, $d$, $e$, $e$ and $f$, $f$, showing the position of the prongs, when the trap has sprung, the prongs as it were interlocking each other.

To enable others to be skilled in the use and application of my invention and improvements, I will proceed to describe the construction and operation thereof, the nature and principles of which consist as follows:

It is a well known fact, that in every section of country where wild and other animals of prey abound, much annoyance is felt, and heavy losses sustained by farmers and others, who reside in the interior parts remote from populated places, through numerous depredations, committed on their sheepfolds, and poultry yards by wolves, foxes, minks, dogs, and other animals, and consequently various means have been from time to time resorted to in order to be relieved of such annoyances, and the human ingenuity has been not a little tried, in order to produce traps or devices, whereby the desired result might be accomplished.

Various traps have been used in the capturing or taking of animals of prey, but it has been most generally found, where wolves, or foxes have been trapped, that they have invariably been caught by the leg, or limbs, and in such cases, they have most generally escaped, because of their biting or pulling off confined limb. Hence, to avoid this, is a matter greatly desired, and consequently from observation and experience, I have been induced to believe, that some kind of device might be produced, that would insure the securing, and final capture of animals of prey, and I believe I have attained that object, in presenting a trap possessing all the important advantages sought after. This trap, is constructed as shown in Figs. 1 and 2, and the manner of making the same is as follows: I take a piece of wrought metal (or the whole trap nearly may be cast), and from it tapering if necessary from one end to the other; the tapered or small end may be turned up, or formed in shape of an eye or ring $x$. The butt or broad end, is formed with two stems, or arms, $b$, and an elbow arm, $b$, $y$. These arms can be made separate, from the base, and screwed or riveted on, if desired, to the platform or base $a$, $a$, $a$. There is an upright center stem or fulcrum $c$, which is fastened in any secure manner, by screw and tap, or it may be welded permanently if desired. These stems or uprights are slotted or split through their upward ends. The slot of stem $b$ is at right angles to the slots in $b$, $y$, and $c$. In the slot $c$ are fastened by an axis pin or screw $s$, the grapples $d$, $d$, $e$, $e$, $f$, $f$. In the slot of the stem or arm $b$, $y$, is attached the lever treadle fall $g$, $g$, $g$. In the slot of stem or arm $b$, is attached the latch catch $i$, $i$, $i$. The elbow end of which is held by the nick hold fast, $h$. A flat spring is next formed of suitable size metal, and may be made tapering from the center toward the ends, which may be formed with eyes or rings $k$. $k$, This spring must be bent over nearly double, the rings or eye ends coming somewhat together, and forming the spring $j$, $j$, as in Fig. 2. The whole device being completed the spring $j$, $j$, is connected with the trap, by passing the ends of the grapple through the eyes or rings $k$, $k$, of the spring. The trap may be set in the following manner: After securing the trap to any suitable place, stake, or tree, it can be set, by pressing with the hand or foot the spring $J$, $J$, until the rings K, K, come nearly together, and below the end of the stem or upright c; the grapples then are thrown back or spread open horizontally; the latch catch i, i, i, being thrown over the double prong grapple d, d, e, e, its elbow end, is fixed in the nick or notch h, of the lever treadle or fall g, g, g, which being done, the trap is set, and ready for being baited in any way, to insure the certainty of the prey, touching the lever treadle g, g, which being touched or pressed down, instantly flies the catch latch i, i, i, the spring j, j flies, the eyes or rings k, k, k, pressing upward against the butt ends of the grapples d, d, e, e and f, f, causes them to come together, and the point f, flying between the points e, e of the grapple d, d, d, and thus it is, that when an animal gets in the trap, the grapples, instead of merely catching by a leg, of the animal, invariably grasps the prey by the head, or around the body, and consequently the prongs of the grapples may pierce or stick through the animal, so that there is little or no possibility of escape and loss of the prey.

Fig. 2, shows the trap sprung.

Having thus fully described my improved trap, and explained its new principle of securing the game; and having shown the same by drawings, Figs. 1 and 2, what I claim as new and original, and my own invention, and desire to secure by Letters Patent of the United States, is as follows, viz:

I claim the lever treadle, set or fall g, g, g, and the elbow catch latch i, i, in combination with the single and double prong grapple d, e, and f, together with the folded spring j, j, specifically as described, and as represented by diagrams 1 and 2.

OLIVER PIER.

Witnesses:
ABNER LEWIS,
AMOS W. MUZZY.